United States Patent
Davis et al.

(10) Patent No.: US 12,545,347 B2
(45) Date of Patent: Feb. 10, 2026

(54) SLOPE SENSITIVE PITCH ADJUSTOR FOR BICYCLE SEAT

(71) Applicant: Koch Bein LLC, Boulder, CO (US)

(72) Inventors: Bradley Craig Davis, Boulder, CO (US); Craig Stephen Etchegoyen, Newport Beach, CA (US)

(73) Assignee: Koch Bein LLC, McKinney, TX (US)

( * ) Notice: Subject to any disclaimer, the term of this patent is extended or adjusted under 35 U.S.C. 154(b) by 819 days.

(21) Appl. No.: 17/875,377

(22) Filed: Jul. 27, 2022

(65) Prior Publication Data

US 2022/0363332 A1 Nov. 17, 2022

Related U.S. Application Data

(63) Continuation of application No. 17/553,374, filed on Dec. 16, 2021, now Pat. No. 11,414,147.

(60) Provisional application No. 63/126,497, filed on Dec. 16, 2020.

(51) Int. Cl.
*B62J 1/08* (2006.01)
*B62J 43/30* (2020.01)
*B62J 45/415* (2020.01)
*B62J 45/42* (2020.01)

(52) U.S. Cl.
CPC ............... *B62J 1/08* (2013.01); *B62J 43/30* (2020.02); *B62J 45/415* (2020.02); *B62J 45/42* (2020.02)

(58) Field of Classification Search
CPC ... B62J 1/08; B62J 45/415; B62J 45/42; B62J 43/30

USPC ........................................................ 280/288.4
See application file for complete search history.

(56) References Cited

U.S. PATENT DOCUMENTS

| | | | |
|---|---|---|---|
| 2006/0226879 A1* | 10/2006 | Kitamura | B62J 6/015 327/94 |
| 2014/0058600 A1* | 2/2014 | Hoffmann | B60L 58/18 180/21 |
| 2015/0034779 A1 | 2/2015 | McAndrews et al. | |
| 2016/0059919 A1* | 3/2016 | Kim | B62J 1/08 248/286.1 |
| 2016/0176463 A1* | 6/2016 | McPherson | B62J 1/08 297/215.15 |
| 2017/0341705 A1 | 11/2017 | Tsuchizawa et al. | |
| 2018/0072377 A1* | 3/2018 | Kishita | B62J 6/028 |

FOREIGN PATENT DOCUMENTS

| | | | |
|---|---|---|---|
| CN | 1765692 A | * 5/2006 | ............. B62J 45/20 |
| WO | 2021223022 A1 | 11/2021 | |
| WO | 2022133144 A1 | 6/2022 | |

* cited by examiner

*Primary Examiner* — Alentin Neacsu
*Assistant Examiner* — Mohamed M Medani
(74) *Attorney, Agent, or Firm* — Burdick Patents, P.A.; Sean D. Burdick; Colin L. Honan (57) ABSTRACT

A slope sensitive pitch adjustor for a bicycle seat includes a rotatable seat support, a gravity sensor mounted thereto, a means for rotating the rotatable seat support, and an automated controller configured to drive the rotating means in response to an acceleration signal received from the gravity sensor. The automated controller stores data representing an initial condition of a pitch angle of the rotatable seat support with respect to horizontal and executes a control algorithm to maintain the initial condition when the bicycle is ridden over changing gradients.

18 Claims, 11 Drawing Sheets

SLOPE SENSITIVE PITCH ADJUSTOR FOR BICYCLE SEAT

RELATED APPLICATIONS

This application is a continuation of and claims priority to U.S. patent application Ser. No. 17/553,374 that was filed on Dec. 16, 2021, which claims priority to U.S. Provisional Application No. 63/126,497 that was filed on Dec. 16, 2020, both of which are fully incorporated herein by reference.

BACKGROUND OF THE INVENTION

Field of the Invention

The present invention relates generally to bicycle accessories, and more specifically to bicycle seats and apparatus for adjusting bicycle seat position.

Description of Related Art

Cycling enthusiasts, whether beginners, occasional cyclists, long-distance cyclists, or other dedicated riders all eventually experience some level of discomfort associated with time spent on the bicycle seat. Most often the discomfort is felt in the perineal region. For example, when riding uphill, an upward slant of the bicycle seat compels the rider to roll back on his or her (hereafter "his") pelvis to avoid discomfort while pedaling harder to maintain speed. This action tends to increase stress on the lower back, and over time can lead to injury.

To avoid the stress, in advance of riding uphill, some riders alter the pitch of the bicycle seat by tilting it nose down a few degrees. A fixed forward tilt, however, can lead to further difficulty when the cyclist rides on a downhill slope that urges the rider further forward on the seat. The rider will tend to counter the forward slippage by pushing his hands and arms against the handlebars, causing the rider to waste energy to maintain a seating position that could otherwise be committed to pedaling. Even worse, a rider pushing against the handlebars while cycling downhill can place excessive weight on the front wheel and cause a high-speed wobble, which increases the risk of a crash. The crash risk is even greater when riding on a downhill turn, or when riding a heavier machine such as an e-bike that is suddenly braked while descending a steep hill.

It is thus an ongoing challenge for cyclists, especially cyclists who compete in racing events, to maintain an optimal riding position as their travel takes them over acclivities and declivities that can displace a cyclist from his optimal riding position and diminish his cycling efficiency. What is needed is a way to make a bicycle seat more adaptable to changing road gradients to minimize negative effects on the cyclist.

SUMMARY OF THE INVENTION

The present invention advances the art of bicycle design by providing an apparatus and method for automatically adjusting the pitch angle of a bicycle seat with respect to a reference axis, such as with respect to horizontal, while a rider rides the bicycle over changing gradients. The invention advantageously optimizes the comfort and cycling efficiency of the rider.

In a basic embodiment of the invention, a slope sensitive pitch adjustor for a bicycle seat includes a rotatable seat support, a gravity sensor mounted to the rotatable seat support, and a means for rotating the rotatable seat support. An automated controller drives the rotating means in response to an acceleration signal received from the gravity sensor. The rotating means may be an electric motor, a pneumatic actuator, or a combination thereof, and the automated controller may be a programmable logic controller. The automated controller stores in memory data representing an initial condition of a pitch angle of the rotatable seat support with respect to horizontal. The initial condition may be selectable by a user, for customization. The automated controller is programmed to maintain the initial condition when the rotatable seat support is mounted to a bicycle being ridden on a slope. In an exemplary embodiment, the automated controller generates an error signal by comparing the acceleration signal with the initial condition, and responsive to the error signal, drives the rotating means to reduce the error signal to zero. In one embodiment, the automated controller and the gravity sensor are integrated on a single chip.

Another embodiment of the invention provides a slope sensitive pitch adjustor for a bicycle seat that employs multiple gravity sensors. The invention includes a rotatable seat support, a first gravity sensor mounted to the rotatable seat support, and a second gravity sensor mounted to the bicycle frame. A rotating means is configured to rotate the rotatable seat support about a pitch axis, and an automated controller is configured to receive a first signal from the first gravity sensor representing a pitch angle of the rotatable seat support, receive a second signal from the second gravity sensor representing a pitch angle of the bicycle frame, compare the first signal to the second signal, and drive the rotating means in response to the comparison to maintain a desired pitch angle of the bicycle seat with respect to the frame. The automated controller may be configured to retrieve, from memory, reference data representing the desired pitch angle. Preferably, the reference data is selectable by a user. The automated controller is programmed to maintain the desired pitch angle when the rotatable seat support is mounted to a bicycle being ridden on a slope. In an exemplary embodiment, the automated controller is programmed to generate an error signal by comparing the result of the comparison of the first and second signals to the reference data, and responsive to the error signal, drive the rotating means to reduce the error signal to zero. The automated controller and one of the gravity sensors may be integrated on a single chip.

In a more elaborate embodiment of the invention, a slope sensitive pitch adjustor for a bicycle seat includes a brace configured for attachment to a frame of a bicycle, an electric motor mounted to the brace, and one or more bearings mounted to the brace. A shaft supported by the one or more bearings is rotatably coupled to the electric motor, and a rotatable seat support is rotatably coupled to the shaft. A gravity sensor is mounted to the rotatable seat support. A controller electrically coupled to the gravity sensor and to the electric motor drives the electric motor in response to an acceleration signal received from the gravity sensor. An electrical power source is electrically coupled to the controller and to the electric motor.

Many variations on the prior embodiment are possible by adding one or more features to the salient elements of the invention. For example, the brace may include a pole configured for telescoping attachment to the bicycle frame, or may include a platform supporting the electric motor, the bearings, or the electrical power source. The rotatable seat support may be coupled to the shaft by a gear assembly. The gear assembly may be configured to mechanically limit a degree of rotation of the rotatable seat support with respect to the frame or brace. The gear assembly may be a worm gear, and a worm wheel of the worm gear may be coupled to a rotor arm extending from the rotatable seat support in a direction substantially perpendicular to the shaft and defining an axis of rotation for the rotatable seat support. In one embodiment, software executable by the controller is programmed to prevent adjustment of the pitch angle beyond selectable limits.

In any embodiment, the pitch adjustor may be configured so that when the bicycle frame is oriented upright on a horizontal surface, all components of the pitch adjustor lie substantially beneath the bicycle seat. The controller may be mounted to the brace, or to the rotatable seat support, or to a printed circuit board. The electric power source may be mounted to the brace or to the seat, and may be a rechargeable battery. A battery charger, electrically couplable to recharge the battery, may be provided as part of the pitch adjustor, in a form energizeable by wheel rotation, or as a solar cell. In any embodiment, the controller may be configured to store in memory data representing an initial condition of a pitch angle of the rotatable seat support with respect to horizontal, the initial condition may be selectable by a user, and the controller may be programmed to maintain the initial condition when the bicycle is ridden on a slope. In any embodiment, the controller may be programmed to generate an error signal by comparing the acceleration signal with the initial condition, and responsive to the error signal, drive the electric motor to reduce the error signal to zero or close to zero. A user interface may be provided, for example, as a handlebar-mounted device, to allow a cyclist to switch the pitch adjustor on and off, to set the initial condition, to set limits on the pitch angle, to engage a battery charger, or to restore the controller to default settings. The user interface may communicate with the controller by wired or wireless means, or via an application resident on a cell phone or other mobile device, or may be voice-activated via a microphone worn by the rider or mounted on the bicycle frame or to the seat.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments of an apparatus and method for automatically adjusting the pitch angle of a bicycle seat with respect to a reference signal, such as an initial condition representing horizontal orientation. The invention, hereafter a slope sensitive seat adjustor, pitch adjuster, or simply adjustor, operates automatically while a rider rides a bicycle equipped with the invention over changing gradients. The invention advantageously optimizes the comfort and cycling efficiency of the rider, while also improving stability and overall safety.

Figure 1:
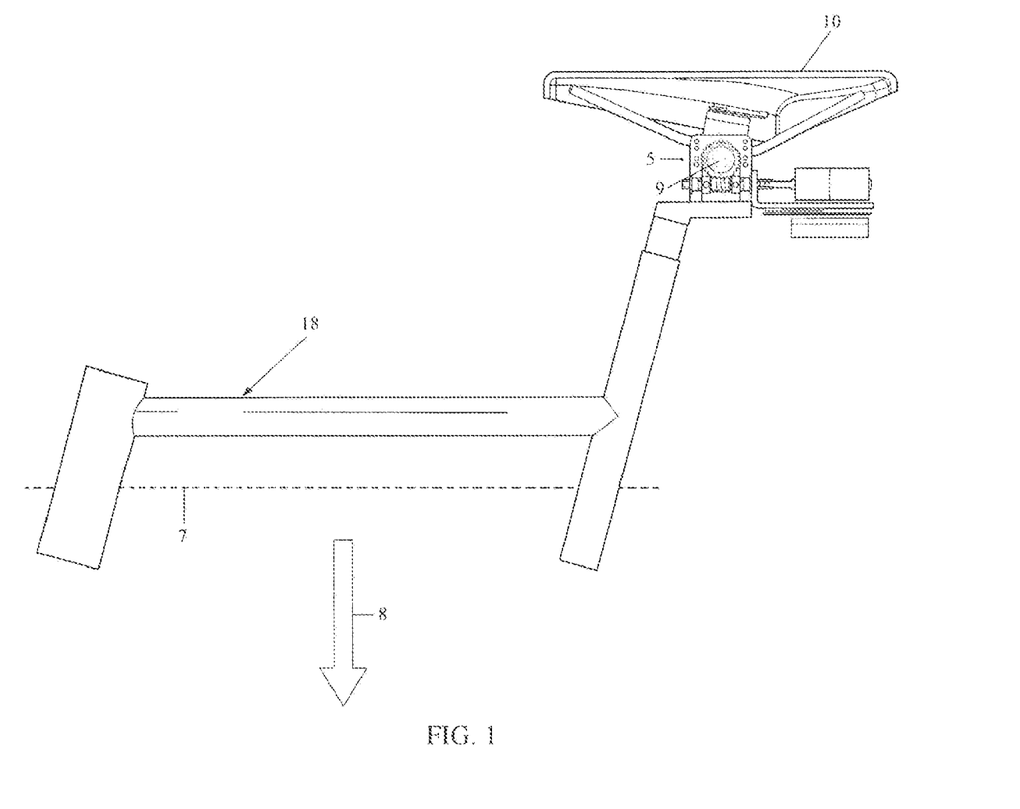
FIG. 1 is a side view of one embodiment according to the invention of a slope sensitive pitch adjustor for a bicycle seat installed on bicycle frame positioned on a horizontal surface.

FIG. 1 shows a side view of one embodiment according to the invention of a slope sensitive pitch adjustor 5 for a bicycle seat 10 installed on a frame 18 of a bicycle. In this view, the bicycle frame 18 is positioned on a horizontal surface that is perpendicular to gravity vector 8. Components of the pitch adjustor 5 are shown mounted above the frame 18 and below the bicycle seat 10. The mounting locations, configurations, shapes, and sizes of these components may vary. For example, many of electrical components of the pitch adjustor 5 may be mounted inside the bike frame 18, inside the bike seat 10, inside a saddle bag affixed to the frame 18, or as low as possible on the bicycle frame 18 to lower its center of gravity. However, the components are arranged, the pitch adjustor 5 is configured to vary the angle of the seat 10 with respect to an imaginary horizontal line 7 (or with respect to another reference such as frame 18) by rotating the seat 10 about a pivot point 9. In one embodiment, the pivot point 9 is positioned as high as possible, and underneath the seating surface of the seat 10. For purposes of illustration only, pivot point 9 is shown at the center of a round spur gear; however, other gear types are possible within the scope of the invention. For example, a wedge-shaped or oval-shaped spur gear may be used, wherein the pivot point occurs near the narrow end of the wedge or oval, so that the pivot point 9 may be located closer to the seat 10.

Figure 2:
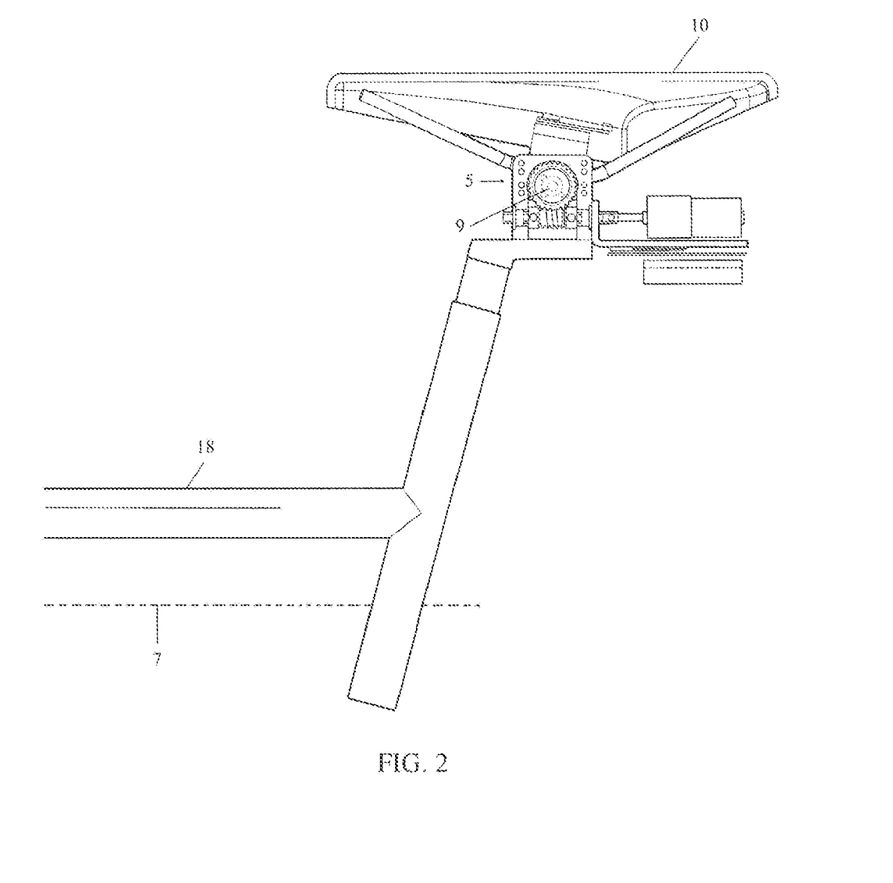
FIG. 2 is a magnified view of the slope sensitive pitch adjustor of FIG. 1.

FIG. 2 shows a magnified view of the slope sensitive pitch adjustor 5. Here, the pivot point 9 is shown coupled to the rotatable seat support 12 at a location beneath a central portion of the seat 10. In other embodiments, the pivot point 9 may be coupled to the rotatable seat support 9 at a location further forward or further toward the rear of the seat 10.

Figure 3:
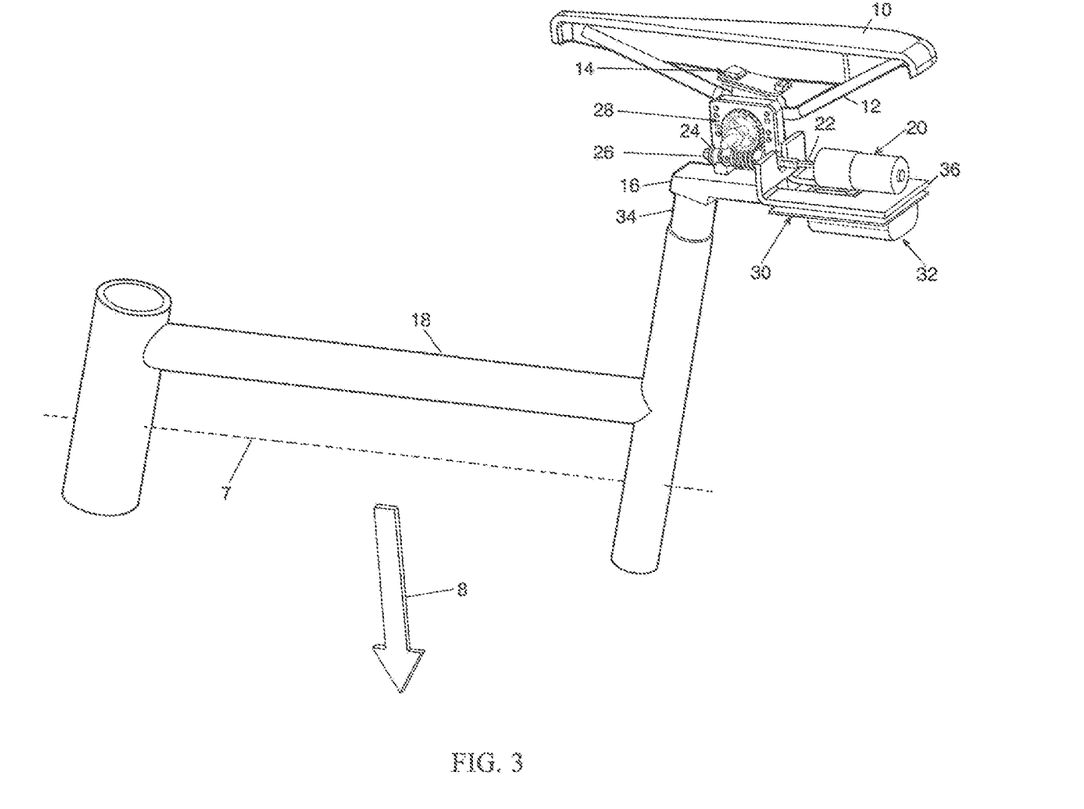
FIG. 3 is a perspective view of the slope sensitive pitch adjustor of FIG. 1, shown with the bicycle seat partially cut away.

FIG. 3 shows a perspective view of the slope sensitive pitch adjustor 5. In this view, the bicycle seat 10 is partially cut away to reveal salient components of the invention. The seat 10 is shown mounted to a rotatable seat support 12. A gravity sensor 14 is mounted to the rotatable seat support 12. The gravity sensor 14 may be a single-axis or multi-axis accelerometer capable of detecting magnitude and direction of the g-force and outputting an electrical signal representing that vector. A brace 16 is configured for attachment to the bicycle frame 18. A second gravity sensor 42 (FIG. 11) may be mounted to the brace 16 or frame 18. A means for providing motive power to the pitch adjustor 5, such as an electric motor 20, may be mounted to the brace 16. A shaft 22 may be rotatably coupled to the electric motor 20 and may be supported by one or more bearings 24. The rotatable seat support 12 may be rotatably coupled to the shaft 22 by a rotation mechanism, which may consist of one or more gears or a gear assembly. In one example, shown throughout the figures, the one or more gears or gear assembly may form a worm gear, consisting of worm 26 and worm wheel 28, as shown. In one embodiment, such a gear assembly may be configured to mechanically limit a degree of rotation of the rotatable seat support 12 with respect to the brace 16. For example, the limit may be set to +/−9 degrees of pitch with respect to a reference signal.

For the pitch adjustor 5, other configurations of rotation mechanisms that couple the seat support 12 to the shaft 22 are possible within the scope of the invention. Such mechanisms may include one or more of a linear motor, a rotary motor, a pneumatic actuator, a hydraulic actuator, a spur gear, a reduction gear, or any combination of the foregoing components that convert a motive force into rotational motion.

A controller 30 may be electrically coupled to the gravity sensor 14 and to the electric motor 20. The controller 30 is configured to drive the electric motor 20 in response to an acceleration signal received from the gravity sensor 14. An electric power source 32, such as a battery, is electrically coupled to the controller 30 and to the electric motor 20 to provide power for these components. The power source 32 may be mounted to the brace 16, as shown. The power source 32 may be any on-board battery used by other battery powered devices on the bicycle, such as an electronic shifter, a dropper seatpost, an e-bike motor, etc. Alternatively, the power source 32 may be mounted to any location on the bicycle from where cabling may be safely routed, such as onto or underneath the seat 10.

The controller 30 may also be mounted to the brace 16, or in another embodiment, the controller 30 may be mounted to the rotatable seat support 12. The controller may also be mounted to a printed circuit board, which in turn may be mounted to the brace 16, as shown. In one embodiment, controller 30 may be a programmable logic controller, either coupled to memory or having integral memory, or both. The controller 30 and the gravity sensor 14 may be mounted to different components of the seat adjustor, or they may be mounted on the same printed circuit board, or may be integrated on the same chip. Electrical connections between the various components can be made wirelessly, or by wire or electrical trace. In one embodiment, the controller 30 is configured to cause rotation of the bicycle seat by executing from memory, and in response to signals from the gravity sensor, a control algorithm that adjusts the pitch of the rotatable seat support 12 within preselected maximum and minimum pitch angles.

Figure 11:
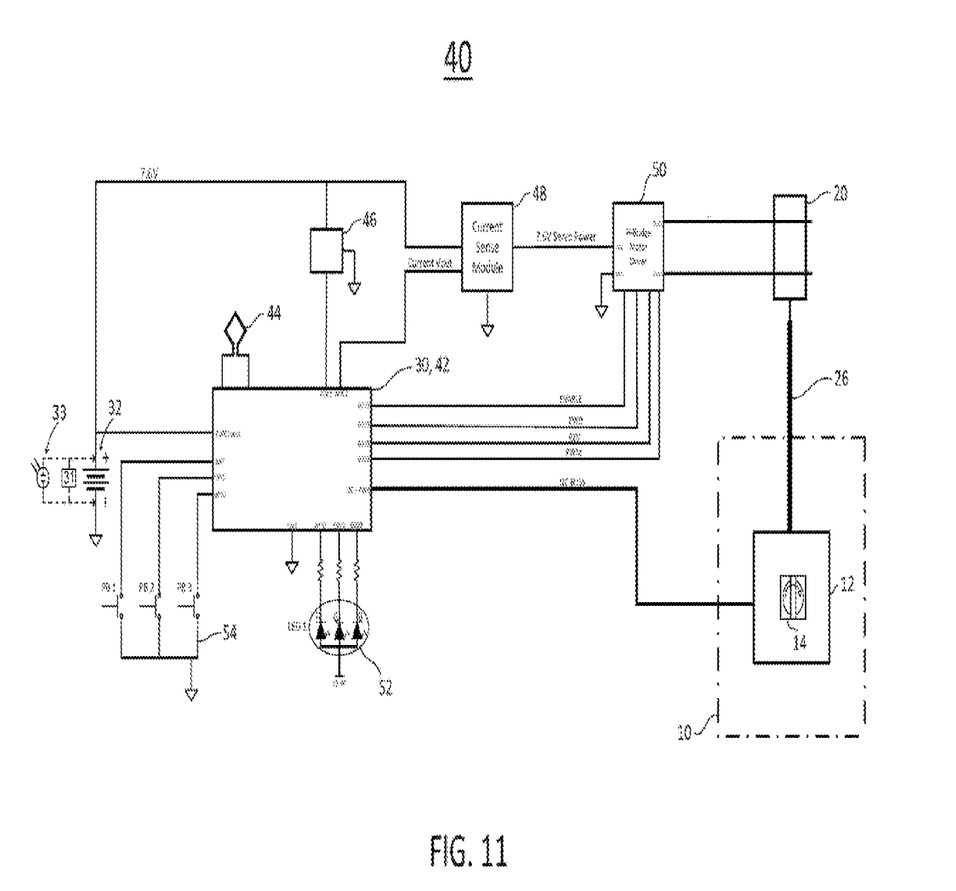
FIG. 11 is a block diagram of one embodiment of a control system according to the invention for a slope sensitive pitch adjustor for a bicycle seat.

In another embodiment that employs multiple gravity sensors, an automated controller is configured to receive a first signal from the first gravity sensor 14 representing a pitch angle of the rotatable seat support, receive a second signal from the second gravity sensor 42 representing a pitch angle of the bicycle frame, compare the first signal to the second signal, and drive the rotating means in response to the comparison to maintain a desired pitch angle of the bicycle seat with respect to the frame. The automated controller may be configured to retrieve, from memory, reference data representing the desired pitch angle of the bicycle seat with respect to the frame.

In one embodiment, the brace 16 includes a pole 34 that is configured for telescoping attachment to the bicycle frame 18. For example, the pole 34 may slide within a vertical section of the bicycle frame 18 that is designed to attach to a bicycle seat. The position of pole 34 within the vertical section is preferably adjustable. The brace 16 may be an assembly of one or more platforms or brackets 36, and fastening hardware, as needed to support various components of the pitch adjustor such as the bearings 26, 28, the electric motor 20, and the electrical power source 32.

In one embodiment, the battery 32 is a rechargeable battery, such as a lithium ion battery. An adjustor according to the invention may also include a battery charger 31. The battery charger 31 may include electronics mounted to a printed circuit board such as the printed circuit board of controller 30. The battery charger 31 may be energizeable by rotation of one or both wheels of the bicycle to which the adjustor is mounted. For example, a generator may be optionally mechanically coupled to a bicycle wheel rim or tire, and output a charging current along electrical cable to energize the battery charger circuit. Optionally mechanical coupling of the generator means that a user (e.g. a cyclist) may mechanically connect a rotor of the generator to the bicycle wheel only when needed to recharge the battery 32, and otherwise mechanically disconnect the rotor from the wheel to avoid putting unnecessary load on the bicycle. In another embodiment, the battery charger 31 may be energizeable by one or more solar cells 33 that are mounted on the adjustor or on the bicycle frame, or on clothing worn by the cyclist. In another embodiment, the battery 32 can be easily manually disconnected and replaced by a fully charged battery when needed. Spent batteries may be later recharged at a battery charger that is remote from the pitch adjustor system. In another embodiment, in lieu of or in addition to an onboard battery charger, battery 32 may be electrically connectable to another onboard power source, such as a main battery used to power an electric bicycle.

According to one embodiment of the invention, the controller 30 is configured to store, in memory, reference data representing an initial condition of a pitch angle of the rotatable seat support 12 with respect to the horizon or equivalently, the horizontal. The initial condition may be whatever seat position or angle is most preferable for a particular cyclist. That is, the initial condition may be one in which a top surface of the seat 10 is parallel to the horizon, at substantially zero degrees of pitch, i.e. less than one degree from zero. In another case, a particular cyclist may ride most comfortably and most efficiently when the seat 10 is set to a non-zero pitch with respect to the horizon, e.g., about 5 degrees tilted in the forward or reverse direction. The invention allows the cyclist to set such a desired initial position of the seat 10, and cause the controller 30 to set this initial condition of pitch (and/or roll) angle as the desired position by storing a value in memory readable by the controller 30. The initial condition, however determined, may be stored in memory readable by the controller 30 as a default condition. For example, with the bicycle resting on horizontal surface and with seat 10 set to a desired angle, the user may press a button mounted to the printer circuit board of the controller 30, which causes storage of a value, then being generated by the gravity sensor 14 and representing the desired angle, as the initial condition.

In another embodiment, data representing more than one desired pitch angle may be stored in memory, to create a profile for seat pitch as a function of the road gradient. For example, a cyclist, either before or during a ride, may select (1) an initial condition of X degrees of pitch (X a rational number) with respect to the bicycle frame when the bicycle frame is sensed as being within +/−10 degrees of horizontal, (2) 0.9X degrees of pitch with respect to the bicycle frame when the bicycle frame is sensed as having >10 degrees of pitch, and (3) −1.1X degrees of pitch with respect to the bicycle frame when the bicycle frame is sensed as having <−10 degrees of pitch. The preceding example is but one of many possible adjustment profiles that may be programmed into the controller 30. Skilled artisans will recognize that many variations on the number of profile settings, and customization of each, are possible within the scope and spirit of the invention.

An algorithm stored in memory accessible by the controller 30 determines when to energize the motor 20 and in what direction to rotate the motor to cause rotation of the rotatable seat support 12 to maintain the desired angle of the bicycle seat with respect to horizontal as the cyclist rides the bicycle up or down a slope, or to maintain a desired pitch angle of the bicycle seat with respect to the frame. Generally, and in accordance with a known control algorithm such as a PID control algorithm, the controller 30 is programmed to generate an error signal by comparing an acceleration signal generated by the gravity sensor 14 with the value stored as the initial condition. or by comparing a difference signal derived from multiple gravity sensors to the value stored as a desired pitch angle of the bicycle seat with respect to the frame. In response to the error signal, and in accordance with the control algorithm, the controller 30 drives the electric motor 20 in a direction that reduces the error signal to zero. The controller 30 may drive the electric motor 20 by generating output signals that open or close relays mounted to the adjustor that in turn energize the windings of the motor according to well-known methods.

In another embodiment, the adjustor includes a feature whereby it may be programmed to periodically change the seat pitch as a function of time. In another embodiment, the adjustor includes a feature whereby it may be switched to manual mode, to allow the cyclist to make occasional manual adjustments to seat pitch as desired via a user interface. For example, the cyclist may press a button on the user interface, or issue a voice command to a microphone, to jog the rotating means to effect a short fore or aft tilt to the seat pitch. These features can be especially advantageous on long rides to alter the seating interface between cyclist and seat for improved comfort and circulation. In one embodiment, the button may be embedded into the nose of the seat 10 for easy access while riding.

Figure 4:
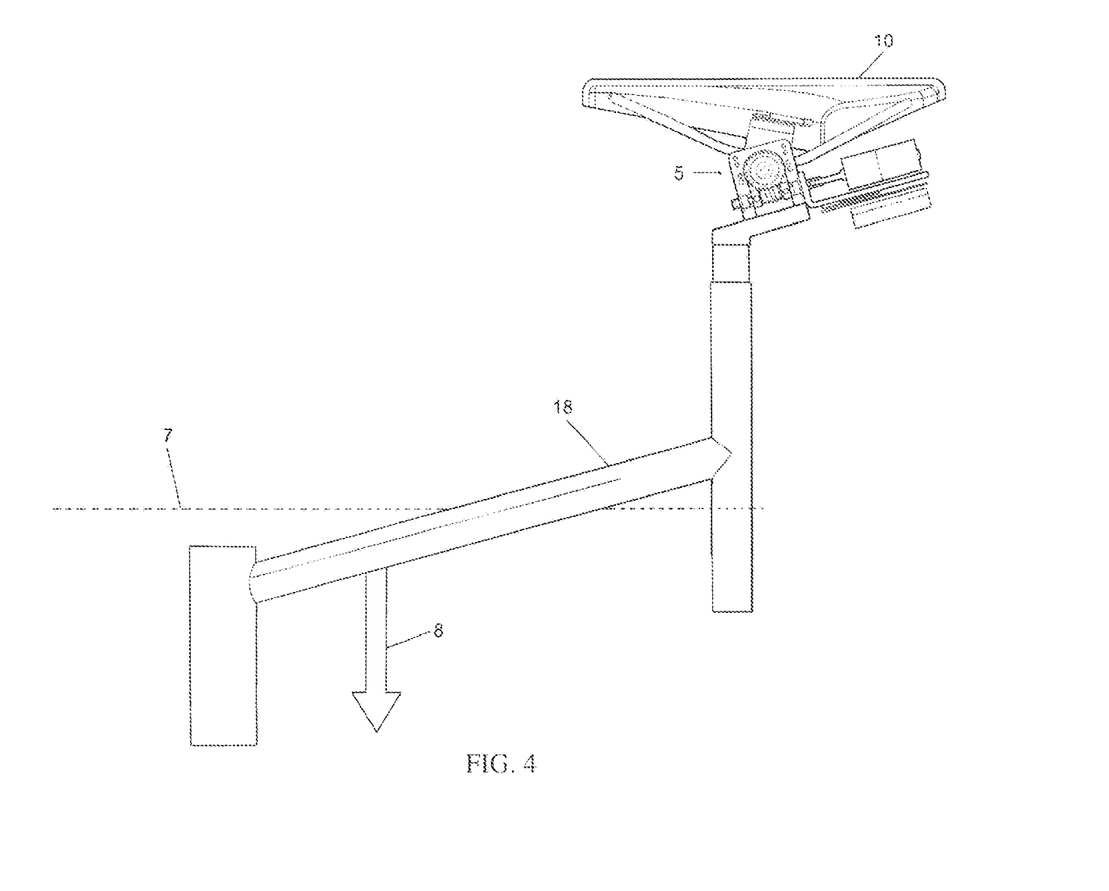
FIG. 4 is a side view of the same slope sensitive pitch adjustor of FIG. 1, shown with the bicycle frame positioned on a downhill slope.
Figure 5:
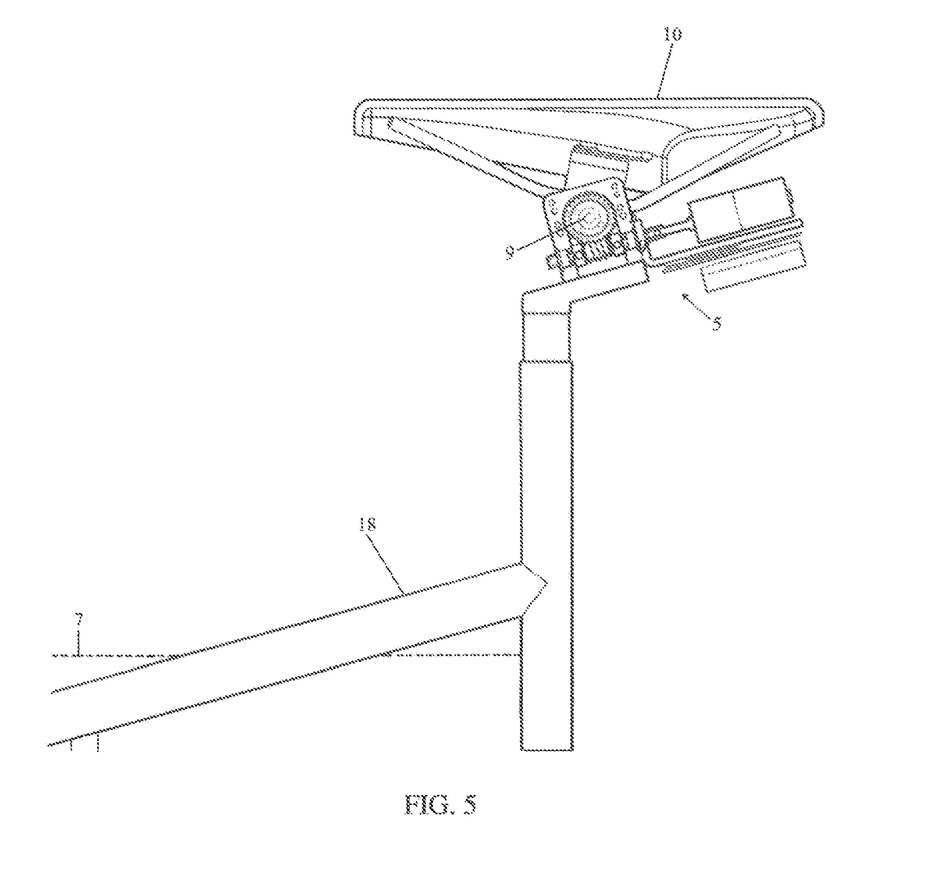
FIG. 5 is a magnified view of the slope sensitive pitch adjustor of FIG. 4.

FIG. 4 shows a side view of the slope sensitive pitch adjustor 5. Here, the bicycle frame 18 is positioned on a downhill slope. For purposes of illustration, this figure assumes that the bicycle has either been parked on the downhill slope for a sufficient time, or has been ridden on a constant downhill slope for a sufficient time, such that the controller 30 of the adjustor has had sufficient time to reduce the error signal to zero and place the seat 10 into the initial condition. According to the invention, a sufficient time for error correction is typically on the order of one, tens, or hundreds of milliseconds, and the resulting change in pitch of the bicycle seat may be imperceptible to the rider. In this example, the initial condition is the default condition, whereby the top surface of the seat is substantially parallel to the horizon. FIG. 5 shows a magnified view of the slope sensitive pitch adjustor of FIG. 4.

Figure 6:
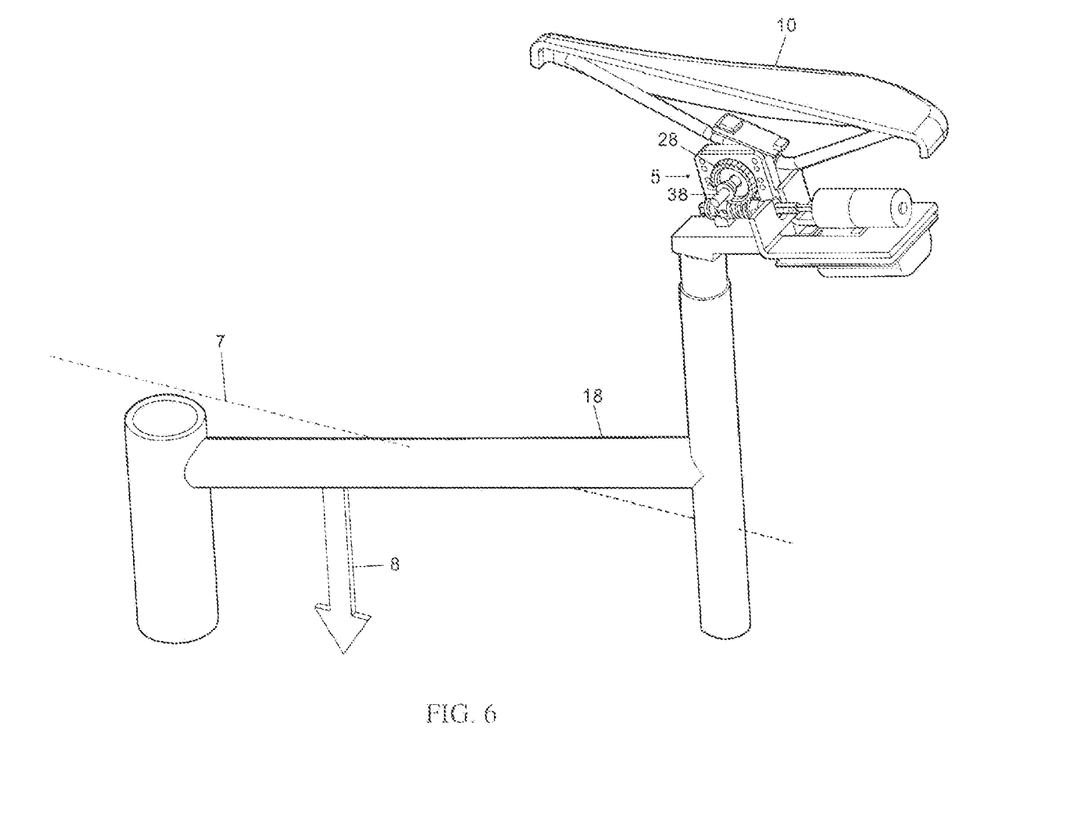
FIG. 6 is a perspective view of the slope sensitive pitch adjustor of FIG. 4, shown with the bicycle seat partially cut away.

FIG. 6 is a perspective view of the slope sensitive pitch adjustor 5, shown with the bicycle seat partially cut away. This view illustrates an embodiment in which the wheel 28 of the gear assembly is coupled to a rotor arm 38. The rotor arm 38 extends from the rotatable seat support 12 in a direction substantially perpendicular to the shaft 22. The rotor arm 38 thus defines an axis of rotation for the rotatable seat support 12, i.e. a pitch axis.

Figure 7:
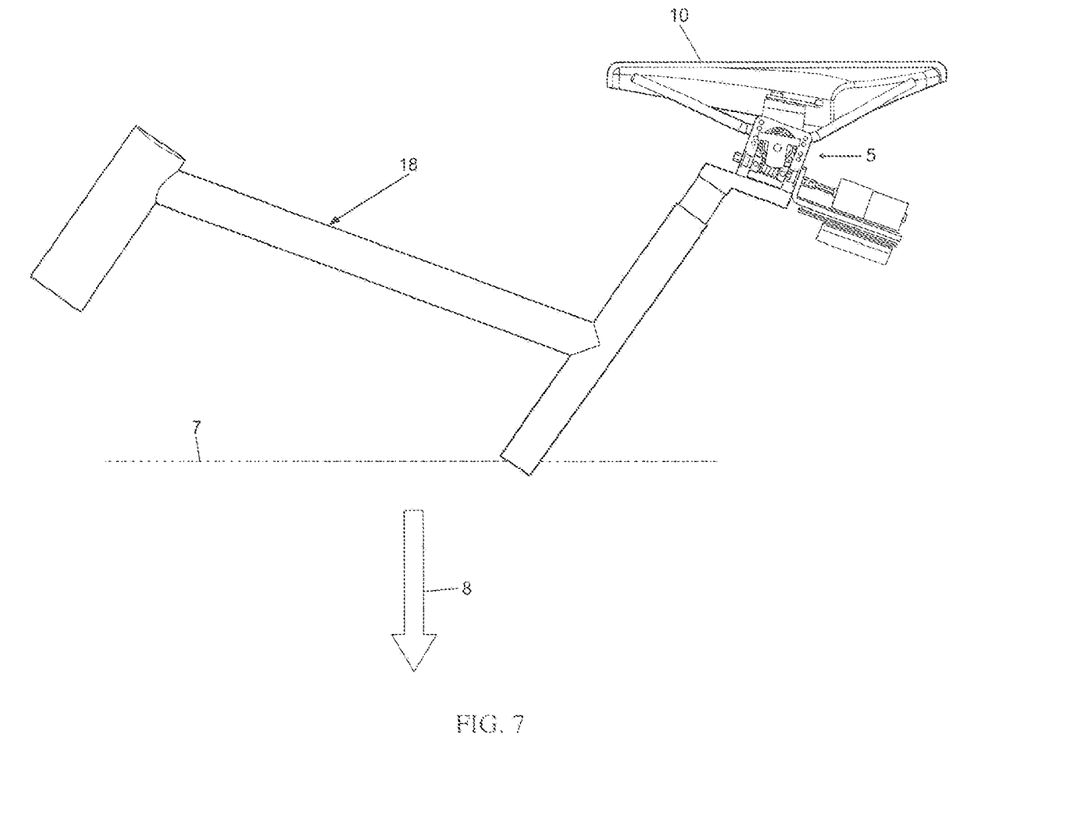
FIG. 7 is a side view of the same slope sensitive pitch adjustor of FIG. 1, shown with the bicycle frame positioned on an uphill slope.

FIG. 7 shows a side view of the slope sensitive pitch adjustor 5. Here, the bicycle frame 18 is positioned on an uphill slope. For purposes of illustration, this figure also assumes that the bicycle has either been parked on the uphill slope for a sufficient time, or has been ridden on a constant uphill slope for a sufficient time, such that the controller 30 of the adjustor has had sufficient time to reduce the error signal to zero and place the seat 10 into the initial condition. In this example, the initial condition is the default condition, whereby the top surface of the seat 10 is substantially parallel to the horizon.

Figure 8:
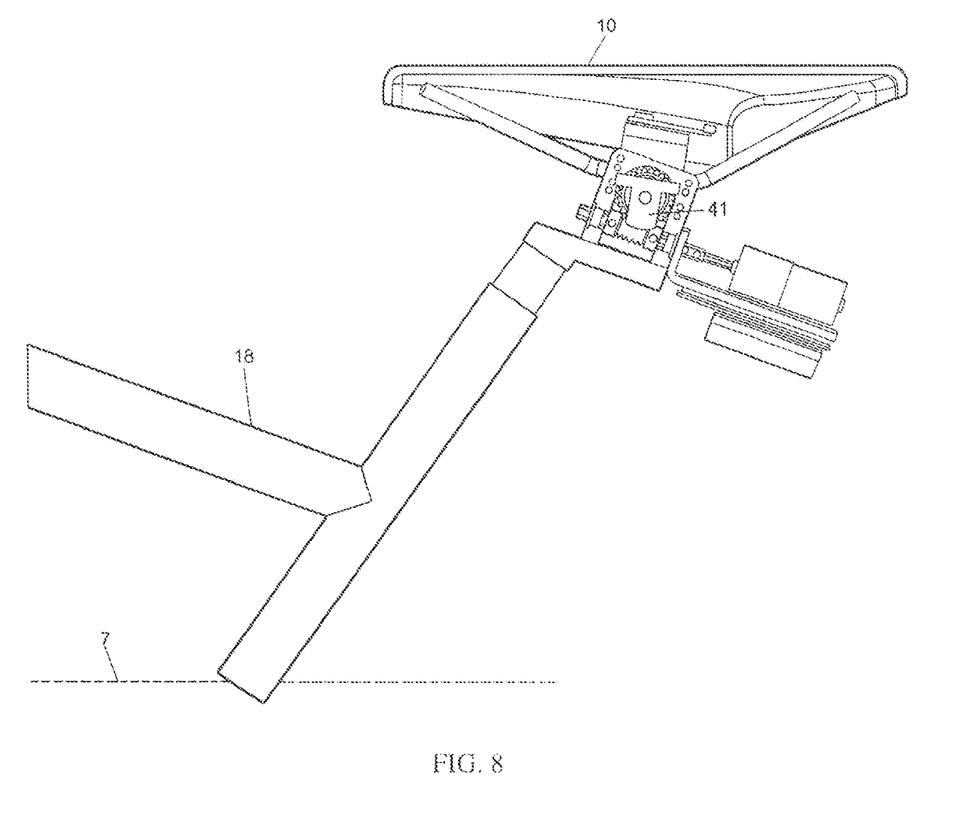
FIG. 8 is a magnified view of the slope sensitive pitch adjustor of FIG. 7.
Figure 9:
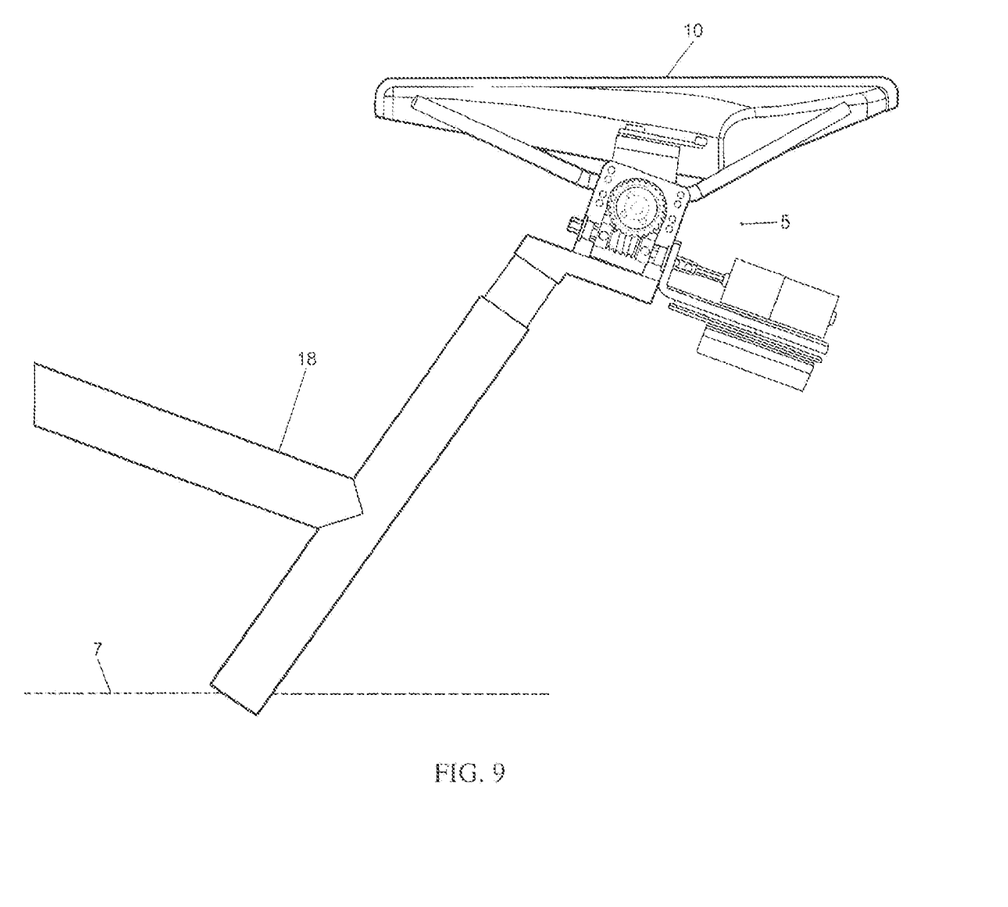
FIG. 9 is another magnified view of the slope sensitive pitch adjustor of FIG. 7.
Figure 10:
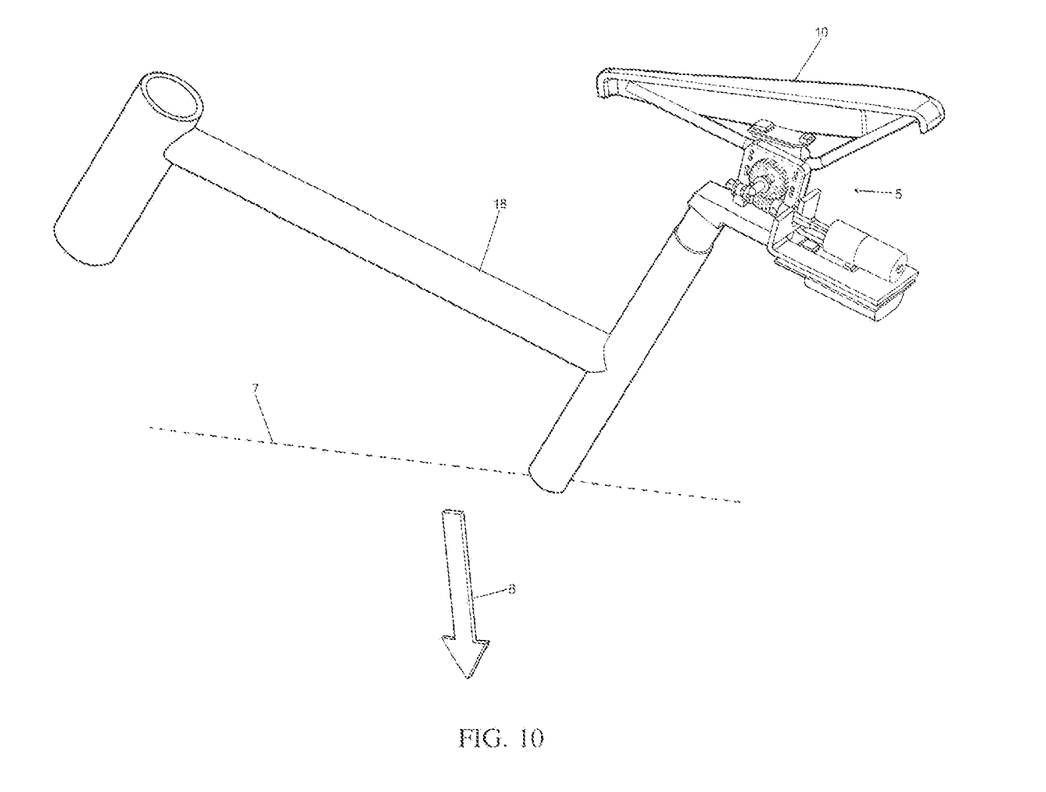
FIG. 10 is a perspective view of the slope sensitive pitch adjustor of FIG. 7, shown with the bicycle seat partially cut away.

FIG. 8 shows a magnified view of the slope sensitive pitch adjustor 5. This view shows an embodiment in which a cam 41 is attached to the end of the shaft 38. FIG. 9 shows another magnified view of the slope sensitive pitch adjustor 5, without the cam 41. FIG. 10 shows a perspective view of the slope sensitive pitch adjustor 5, in which the bicycle seat 10 is partially cut away to illustrate a mounting configuration for the components of the pitch adjustor.

FIG. 11 shows a block diagram of one embodiment according to the invention of a control system 40 for a slope sensitive pitch adjustor for a bicycle seat. Controller 30 is the main component of the control system 40. Controller 30 may consist of a programmable logic controller or microcontroller fabricated as an integrated circuit. Controller 30 may be integrally formed with, or may be electrically coupled to, an inertial measurement unit (IMU) 42 that functions as the second gravity sensor capable of generating a signal representing a pitch vector. One example of an IMU 42 suitable for use in an adjustor of the present invention is an ST Electronics chip model LSM9DS1. Other components of controller 40 may also be either integrally formed with the microcontroller 30, or may be separate components electrically coupled to the microcontroller 30 (for example, on a common printed circuit board), and these components include an antenna 44, a voltage sensing module 46, a current sensing module 48, an H-bridge motor driver 50, an LED 52, and a switching module 54. The seat 10, rotatable seat support 12, gravity sensor 14, motor 20, worm 26, and battery 32 operate as previously described.

Antenna 44 is electrically coupled to the controller 30 and may be configured to both transmit and receive wireless signals. In one embodiment, antenna 44 is configured for communication using the Bluetooth protocol, to enable a cyclist to issue commands to the controller 30 via a mobile device, and to receive signals such as displays and alerts from the controller 30 via the mobile device or other user interface. Antenna 44 may be integral to the controller 30, or may be a separate component coupled thereto. For example, the controller 30 may be a microcontroller module, and may be mounted along with the antenna 44 to a common circuit board configured with trace conductors that electrically connect the two components.

The voltage sensing module 46 and the current sensing module 48 provide protective features for the system 40. Voltage sensing module 46 monitors battery voltage to ensure that corrective action can be taken should battery voltage drop below a predetermined minimum threshold. For example, the system 40 may be configured to alert the operator, e.g. by visual or audible alarm, if the sensed voltage drops below about 6.0 VDC, to indicate the need to replace the battery 32. In another example, if the sensed voltage drops below the predetermined minimum threshold, the controller 30 drives the seat pitch to the initial or default condition and shuts down further control until battery power is restored to a level above the minimum threshold.

Current sensing module 48 protects the battery 32 from an overcurrent condition. For example, a jam in the gear train or other excessive load could cause the current to surge beyond the ratings of the system. If the current sensing module 48 detects such a condition, it signals to controller 30 to shut off output power from the H-bridge motor driver 50. In one embodiment, the H-bridge motor driver 50 is configured to drive the motor 20 by pulse-width modulation of DC power in either a forward or reverse direction, corresponding to forward and reverse pitch adjustment of the bicycle seat 10. Operating power for the voltage sensing module 46, current sensing module 48, and H-bridge motor driver 50 may be provided by the battery 32.

The LED 52 may be provided as an optional means for displaying the status of the control system 40. LED 52 may be a multicolor LED or bank of LEDS, that respond to illumination signals from the controller 30 to indicate, for example, whether the adjustor is on, ready to program, calibrating, etc. The switching module 54 is an optional user interface, which may be mounted to any convenient location on the bicycle, such as on a vertical part of the frame or on the handlebars. Pushbuttons on the switching module 54 allow a user to switch the control system 40 on and off, ready it for programming, make menu selections, reset to default, etc.

In another embodiment, an electronic module comprising a low pass filter (not shown) or other filtering algorithm may be coupled to one or both gravity sensors 14, 42 to reject high-frequencies and smooth out vector signals transmitted to the controller 30. In this manner, high frequency signals or other transients caused by small bumps in the road, random vibrations, or rocks encountered while mountain-biking, will not have significant affect on responsive seat corrections. In one embodiment, the filtering algorithm may employ a Kalman filtering technique when processing signals received from the one or more gravity sensors 14, 42. The control algorithm run by controller 30 then responds to input received from the output of the filtering algorithm.

In one embodiment, the control algorithm is programmed to continuously correct the error signal and drive it to zero in response to any amount of error detection, to maintain the desired pitch of the seat 10. In another embodiment, error corrections are made in a series of discrete steps. For example, the control algorithm is programmed not to issue a corrective signal to change the seat pitch unless the filtered signal from the gravity sensor indicates an error that exceeds a minimum threshold. The minimum threshold may be set to any desired level, such as one or more degrees of pitch, or any fractional degree of pitch. When the detected error exceeds that threshold, the controller 30 activates the motive force (e.g. motor 20 via H-bridge motor driver 50) to adjust the seat pitch until the error is zeroed, at which point the motive force is deenergized to hold the seat pitch in place, until the controller 30 detects a subsequent error that exceeds the threshold, then adjusts the pitch to correct for that error, and so on. Discrete-step correction according to the invention advantageously saves power, and also provides a more stable experience for the rider.

The invention in another embodiment allows a rider to correct seat pitch on demand. That is, the controller 30 is configured to act as a slave controller to manual control signals. This mode of operation may be enabled by the rider selecting an option for manual operation by way of the user interface. Commands to adjust seat pitch fore or aft may be issued by the rider by voice or pushbutton. In response, controller 30 adjusts the seat pitch either continuously until commanded to stop, or in a series of discrete steps where the degree of pitch for each discrete step is predetermined in the control algorithm or preselected by the rider. In another embodiment, automatic control by controller 30 is enabled and operates as previously described, and is also subject to manual adjustment.

In another embodiment, the pitch adjustor 5 is configured to limit pitch corrections to a maximum degree, both fore and aft, which may have the same or differing absolute values. For example, the maximum corrections may be +15/−10 degrees, or +9/−9 degrees. In addition, the pitch adjustor 5 may be configured to adjust pitch among the span of maximum corrections in fixed increments, for example, in plus-or-minus 1-degree increments or plus-or-minus an increment of a fractional degree such as $\frac{1}{10}$th of a degree. In another embodiment, one or both of the maximum pitch corrections and the fixed increment of correction may be selectable by the rider. In one implementation, a software application downloadable to a mobile phone or other computerized user-interface is configured to communicate electronically with control system 40, to enable the aforesaid rider selections, selectable system configurations, and manual commands.

An advanced version of the software application may provide an automatic mode of operation in which the mobile phone or other computerized device receives GPS coordinates in real time, derives speed and location data from changes in GPS coordinates, predicts changes in the slope of terrain being traveled by the bicycle by referencing topographical data, and adjusting seat pitch according to the predicted changes. The topographical data may be downloaded to the mobile phone or other computerized device by the rider in advance of scheduled travel.

In view of the foregoing principles of the invention for an automated slope sensitive pitch adjustor for a bicycle seat, it should be appreciated by skilled artisans that salient elements of the invention include a rotatable seat support 12, a gravity sensor 14 mounted to the rotatable seat support 12, a means for rotating the rotatable seat support 12, and an automated controller 30 that drives the rotating means in response to an acceleration signal received from the gravity sensor 14. The rotating means may be an electric motor 20, and the automated controller 30 may be a programmable logic controller. The automated controller 30 stores in memory data representing an initial condition of a pitch angle of the rotatable seat support 12 with respect to horizontal, and the automated controller 30 is programmed to maintain the initial condition when the rotatable seat support 12 is mounted to a bicycle being ridden on a slope. In another embodiment, the automated slope sensitive pitch adjustor further includes a second gravity sensor that is mounted to the bicycle frame, and the controller 30 is programmed to maintain a desired pitch angle of the bicycle seat 10 with respect to the frame, by driving the rotating means to correct an error signal representing the difference between (1) the difference between pitch vectors received from the two gravity sensors, and (2) the desired pitch angle of the bicycle seat with respect to the frame.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A slope sensitive pitch adjustor for a bicycle seat, comprising:
    a brace configured for attachment to a frame of a bicycle;
    an electric motor mounted to the brace;
    one or more bearing mounted to the brace;
    a shaft rotatably coupled to the electric motor and supported by the one or more bearings;
    a rotatable seat support rotatably coupled to the shaft;
    a gravity sensor mounted to the rotatable seat support;
    a controller electrically coupled to the gravity sensor and to the electric motor and configured to drive the electric motor in response to an acceleration signal received from the gravity sensor, wherein the controller is configured to store in memory data representing an initial condition of a pitch angle of the rotatable seat support with respect to horizontal and programmed to generate an error signal by comparing the acceleration signal with the initial condition and, responsive to the error signal, drive the electric motor to reduce the error signal substantially to zero;
    a user interface in communication with the controller; and
    a battery electrically coupled to the controller and to the electric motor, wherein the controller further comprises a voltage sensing module stored in memory, wherein the voltage sensing module is configured to monitor the battery for change in a sensed voltage and generate an alarm when the sensed voltage drops below a predetermined threshold.

2. The pitch adjustor of claim 1, wherein the controller further comprises an antenna configured for wireless communication between the controller and the user interface.

3. The pitch adjustor of claim 2, wherein the user interface comprises a mobile phone application in wireless communication with the controller via the antenna.

4. The pitch adjustor of claim 1, wherein the user interface comprises a display screen mounted on the frame of the bicycle and in wired communication with the controller.

5. The pitch adjustor of claim 1, wherein the user interface further comprises means for manually controlling the electric motor to adjust the pitch angle.

6. The pitch adjustor of claim 1, wherein the user interface further comprises display means to display the alarm generated by the voltage sensing module.

7. The pitch adjustor of claim 1, wherein the controller further comprises a current sensing module stored in memory, wherein the current sensing module is configured to monitor the battery for change in a sensed electric current and send a shutoff command to the controller where the sensed electric current exceeds a predetermined threshold.

8. The pitch adjustor of claim 1, wherein the controller further comprises a filtering algorithm stored in memory, wherein the filtering algorithm is configured to drive the electric motor to reduce the error signal substantially to zero only when the error signal has exceeded a predetermined threshold.

9. The pitch adjustor of claim 8, wherein the user interface further comprises means to manually set and adjust the predetermined threshold of the error signal.

10. The pitch adjustor of claim 1, wherein the user interface further comprises means to set a predetermined maximum pitch adjustment angle and a minimum pitch adjustment angle.

11. A slope sensitive pitch adjustor for a bicycle seat, comprising:
    a brace configured for attachment to a frame of a bicycle;
    an electric motor mounted to the brace;
    one or more bearings mounted to the brace;
    a shaft rotatably coupled to the electric motor and supported by the one or more bearings;
    a rotatable seat support rotatably coupled to the shaft;
    a gravity sensor mounted to the rotatable seat support;
    a controller electrically coupled to the gravity sensor and to the electric motor and configured to drive the electric motor in response to an acceleration signal received from the gravity sensor, wherein the controller is configured to store in memory data representing an initial condition of a pitch angle of the rotatable seat support with respect to horizontal and is configured to execute a filtering algorithm to generate a filtered error signal from the acceleration signal, and responsive to the filtered error signal exceeding a preset threshold, drive the electric motor to reduce the filtered error signal substantially to zero; and
    a battery electrically coupled to the controller and to the electric motor, wherein the controller further comprises a voltage sensing module stored in memory, wherein the voltage sensing module is configured to monitor the battery for change in a sensed voltage and generate an alarm when the sensed voltage drops below a predetermined threshold.

12. The pitch adjustor of claim 11, wherein the electric motor is only energized in response to the generation of the filtered error signal.

13. The pitch adjustor of claim 11, wherein the electric motor is deenergized in response to the filtered error signal being reduced substantially to zero.

14. The pitch adjustor of claim 11, wherein the initial condition is selectable by a user.

15. The pitch adjustor of claim 11, wherein the preset threshold is selectable by a user.

16. The pitch adjustor of claim 11, wherein the controller further comprises data stored in memory representing a maximum pitch angle adjustment, wherein responsive to the filtered error signal exceeding the preset threshold, the controller drives the electric motor to the maximum pitch angle adjustment to reduce the filtered error signal substantially to zero.

17. The pitch adjustor of claim 16, wherein the filtering algorithm comprises a low pass filter.

18. The pitch adjustor of claim 11, further comprising a user interface in communication with the controller.

* * * * *